Patented Oct. 13, 1953

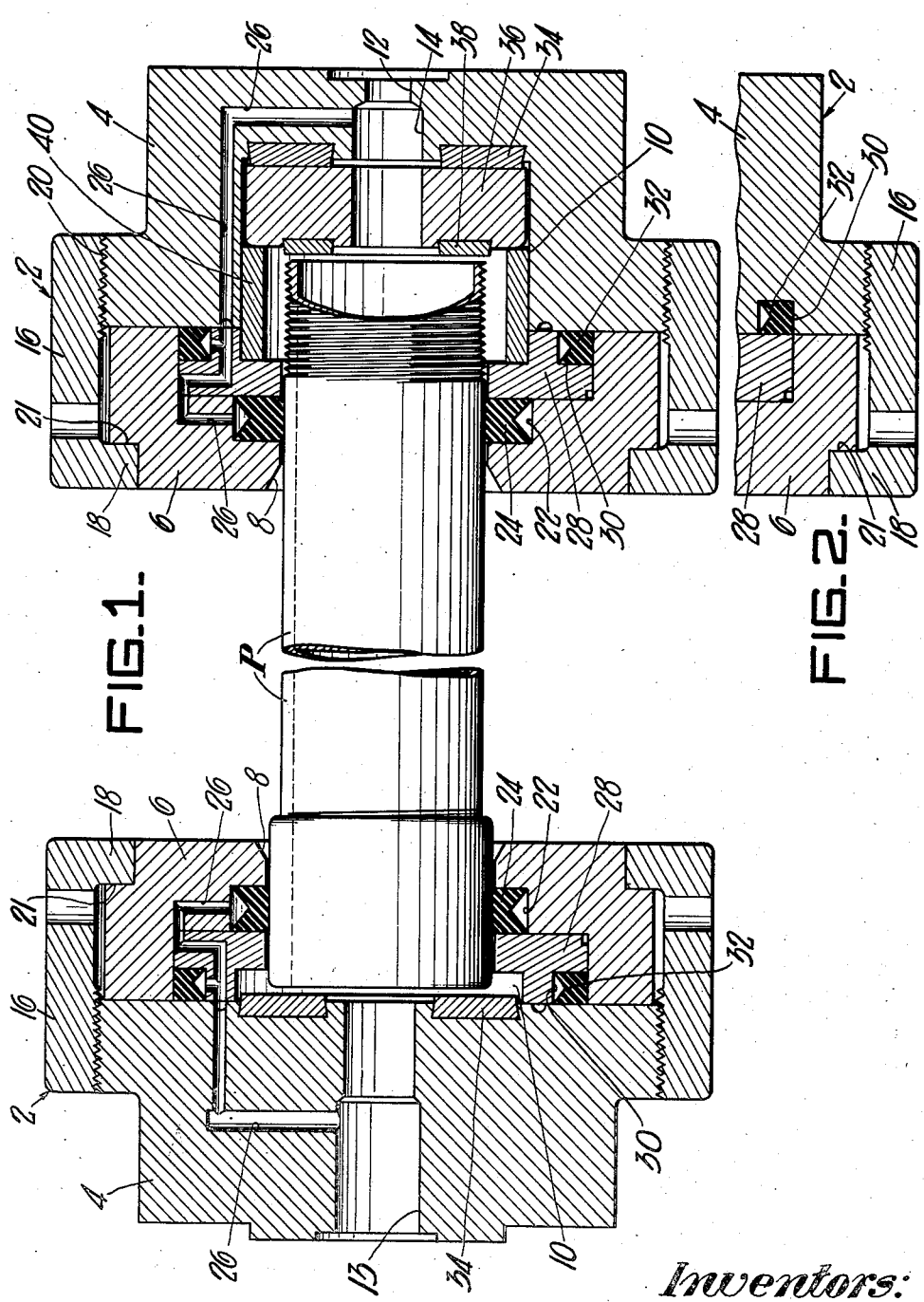

2,655,182

UNITED STATES PATENT OFFICE 2,655,182

PIPE TESTING HEAD ASSEMBLY

Loren A. Hayes and Walter C. Swancott, Elyria City, Ohio, assignors to United States Steel Corporation, a corporation of New Jersey Application February 23, 1950, Serial No. 145,632

2 Claims. (Cl. 138—90)

This invention relates to apparatus for testing pipe and other tubular objects under hydrostatic pressure and more particularly to the testing head assemblies of such apparatus.

Prior to our invention the testing heads used on hydrostatic testing equipment were solid one-piece structures fastened to the test pump proper by means of a gasketed joint. To change heads for the various size pipe it was necessary to break and make this joint. These heads were pressed against the open ends of the pipe or tube to be tested as a means of sealing. This imposed a column effect on the pipe which was not encountered in ordinary pipe use. For example, when testing to 60% of yield, the column effect pressure created has been found to be about 10% of the desired 60% of yield. In other words, the pipe was really being subjected to an actual test of 66% of yield strength rather than the desired 60%. The percentage column effect pressure has been found to increase with an increase in test pressure.

The primary object within contemplation of our present invention is to overcome the above-mentioned difficulties by providing a test head that is adapted to be permanently gasketed to a hydrostatic pipe testing machine.

As a corollary to the object immediately above, it is a further object of our present invention to provide a test head assembly made up of several separate parts easily adjustable to suit a wide range of pipe sizes.

It is a further object of our invention to provide a pipe test head assembly that utilizes external hard-faced elastomer sealing rings to substantially eliminate any column effect on the pipe being tested.

These and other objects will be more apparent after referring to the following specification and attached drawing, in which:

Figure 1 is a cross-sectional view showing two head assemblies of our invention in position for testing a pipe length; and Figure 2 is a cross-sectional view showing a modification.

Referring in detail to the drawing, numeral 2 indicates the main body portion of our invention. Said body portion includes, in abutting relationship, an outer annular hub 4 and an inner centering plate 6 having a center opening 8 therethrough. Hub 4 is provided with a pipe-end receiving chamber 10 which communicates with the center opening 8. A pressure fluid inlet 12 passes through the rear wall of the hub 4 and communicates with chamber 10 by means of a pressure fluid passageway 14 which extends therebetween. Inlet 12 is connected to a pressure fluid pump (not shown).

The head assembly shown at the left in Figure 1 is similar to the head shown on the right but is affixed to the discharge end of the pipe length being tested. The opening indicated at 13 in the discharge head corresponds to inlet 12 but is slightly larger in diameter and functions as a fluid outlet rather than an inlet.

The hub 4 has a threaded external periphery. The hub 4 and plate 6 are held in abutting relation by means of an annular collar 16 having a flanged edge 18. The inner periphery of the unflanged edge 20 of the collar is threaded. The clamping collar 16 is mounted around the outer periphery of the main body portion 2 with the inside of its flanged edge 18 abutting the outer face of the centering plate 6 and its other edge 20 in threaded engagement with the external periphery of the hub 4. A portion of the outer face of the centering plate 6 is cut away so as to form a shoulder abutment 21 for seating the flanged edge 18.

A groove 22 surrounding the center opening 8 is provided on the inner wall of the centering plate 6. A sealing ring 24, made of an elastomer such as rubber, having a hard external surface is seated within the groove. Ring 24 functions as a water-tight seal around the outside diameter of a pipe "P" inserted through the center opening 8 in a manner to be more fully explained hereinafter.

As best seen in Figure 1, a fluid duct 26 extends between the groove 22 and the fluid passageway 14 whereby the sealing ring 24 may be compressed by the pressure fluid passing through duct 26 to tightly surround the pipe "P." When the hydraulic test pressure is applied to the pipe by means of the inlet 12 and the pressure fluid passageway 14, it is also applied to the outside peripheral face of the elastomer sealing ring 24 by means of the fluid duct 26. The sealing ring 24 is compressed radially by this application of pressure to provide a fluid tight seal around the outside surface of the pipe being tested. The sealing action by the sealing ring takes place at the inside corners of the ring surface that contacts the pipe. A wedging action or concentration of pressure takes place at these corners according to the degree of elasticity of the material of which the sealing ring is made. The elastomer used is elastic enough to cause sufficient wedging to seal the inside corner which is exposed to the test pressure but is not elastic enough to permit it to be extruded at the outside corner which is exposed to atmospheric pressure. It holds the ring seal fluid tight during the test pressure period. When the test pressure is released, the ring 24 expands to its normal diameter which opens it away from its contact with the external surface of the pipe so that the pipe may be quickly and easily removed after testing. A retaining ring 28 is fitted within centering plate 6 adjacent the sealing ring 24 to hold the same in position within groove 22.

A groove 30 is provided around the inner face of the retaining ring 28. Groove 30 has an opening in its inner surface whereby it communicates with the fluid duct 26. A packing ring 32 is fitted within groove 30. The purpose of the packing ring 32 in the assembly is to assure a fluid-tight seal between the hub 4 and the centering plate 6. The packing ring is compressed radially by the internal fluid pressure which expands the ring to a fluid-tight seal during the test pressure period by means of the fluid duct 26. Packing ring 32 contracts to normal size when the test pressure is released.

It may be pointed out that while we have shown the groove 30 as being in the retaining ring 28 it may be made in the abutting face of the hub 4 instead and the sealing ring 32 fitted therein. This arrangement is shown in Figure 2.

A circular plate 34 of soft metal such as copper is inserted into the rear wall of the pipe-end receiving chamber 10 to absorb the shock and prevent damage to the pipe ends during the testing operation. However, the insert does not seal off the pipe end.

It will be noted that the pipe-end receiving chamber 10 of the head, shown on the right in Figure 1, is somewhat larger than the chamber in the head on the left. The larger chamber is provided in the one head so as to enable the sealing ring 24 to be positioned clear of the pipe threads when testing pipe having long threads. If the pipe being tested has standard length threads, a short filler block 36 having soft metal inserts 38 is fitted into the chamber 10, as shown in the head on the right of Figure 1. The soft metal inserts 38 function similarly to the plate 34 to prevent damage to the pipe end. A long filler block is used when testing pipe with plain ends. When a filler block is used, a spacer ring 40 is inserted into the chamber 10 between the retaining ring 28 and the filler block 36 to hold the filler block in proper position. When a pipe having a long thread is tested, both the filler block and the spacer ring are removed.

Figure 1 illustrates a pair of heads being used to test a threaded pipe having a coupling on one end. In this set-up, the operation will also test the tightness of the joint between the coupling and the pipe.

While one embodiment of our invention has been shown and described, it will be apparent that other adaptations and modifications may be made without departing from the scope of the following claims.

We claim:
1. In apparatus for hydrostatically testing tubular objects, the improvement comprising a test head having a main body portion, said body portion including an outer annular hub and an inner centering plate abutting against said hub, said centering plate having an opening therethrough, said outer hub having a tube-end receiving chamber therein communicating with said center opening, said chamber having a fluid inlet in the wall remote from said centering plate, said inlet communicating with the chamber by means of a pressure fluid supply passageway extending therebetween, an annular clamping collar having a flanged edge mounted around the outer periphery of said body portion with its flanged edge abutting the outer face of said centering plate and its other edge in threaded engagement with the periphery of the outer hub, an elastomer sealing ring fitted in said centering plate surrounding the center opening therein, a pressure fluid duct extending between said ring and said pressure fluid supply passageway, said ring being adapted to surround the end of a tube length and to be compressed radially by means of pressure fluid flowing through said duct, a retaining ring mounted within said centering plate adjacent said sealing ring to hold the same in position, and an elastomer sealing ring fitted between said retaining ring and said outer hub portion.

2. In a hydrostatic pipe testing apparatus, a pair of spaced coaxial heads having recesses in their opposed faces adapted to receive the end of a pipe, one of said heads having an inlet for pressure fluid communicating with its recess, a circumferential groove in each head extending around the recess therein, a radially compressible sealing member seated in said groove and adapted to surround the end of a pipe length, a passage in said head extending from said inlet to said groove, a retaining ring mounted within said head adjacent said sealing ring to hold the same in position, each of said heads including a body portion composed of two tubular members abutting end to end, one of said members having a groove in the end thereof adjacent the other member, a sealing ring in said last named groove, and a connection from said passage to said last named groove for applying pressure to said last named sealing ring effective to urge it against said other member.

LOREN A. HAYES.
WALTER C. SWANCOTT.

References Cited in the file of this patent

UNITED STATES PATENTS

| Number | Name | Date |
| --- | --- | --- |
| 1,757,724 | Larson | May 6, 1930 |
| 2,107,922 | Westin | Feb. 8, 1938 |
| 2,241,526 | Rosenkranz | May 13, 1941 |
| 2,481,013 | Henderson | Sept. 6, 1949 |

FOREIGN PATENTS

| Number | Country | Date |
| --- | --- | --- |
| 551,566 | Great Britain | Mar. 1, 1943 |